US 8,170,126 B2

(12) United States Patent
Muharemovic et al.

(10) Patent No.: US 8,170,126 B2
(45) Date of Patent: May 1, 2012

(54) REFERENCE SIGNAL STRUCTURE FOR OFDM BASED TRANSMISSIONS

(75) Inventors: Tarik Muharemovic, Dallas, TX (US); Zukang Shen, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 748 days.

(21) Appl. No.: 12/233,813

(22) Filed: Sep. 19, 2008

(65) Prior Publication Data

US 2009/0080500 A1 Mar. 26, 2009

Related U.S. Application Data

(60) Provisional application No. 60/974,184, filed on Sep. 21, 2007, provisional application No. 61/048,392, filed on Apr. 28, 2008, provisional application No. 61/051,885, filed on May 9, 2008.

(51) Int. Cl.
*H04L 27/28* (2006.01)

(52) U.S. Cl. ........ 375/260; 375/146; 375/267; 375/299; 455/101; 455/132; 455/500; 455/562.1; 370/334; 370/335; 370/342; 370/343; 370/344; 370/441

(58) Field of Classification Search .................. 375/146, 375/260, 267, 299; 455/101, 132, 500, 562.1; 370/334, 335, 342, 343, 344, 441
See application file for complete search history.

(56) References Cited

U.S. PATENT DOCUMENTS

| 4,951,279 | A | * | 8/1990 | Hotta | 370/319 |
| 5,937,336 | A | * | 8/1999 | Kumagai | 455/126 |
| 6,377,819 | B1 | * | 4/2002 | Gesbert et al. | 455/562.1 |
| 2003/0021365 | A1 | * | 1/2003 | Min et al. | 375/343 |
| 2006/0050799 | A1 | * | 3/2006 | Hou et al. | 375/260 |
| 2007/0183386 | A1 | * | 8/2007 | Muharemovic et al. | 370/344 |
| 2008/0310383 | A1 | * | 12/2008 | Kowalski | 370/342 |

OTHER PUBLICATIONS

3GPP, 3rd Generation Partnership Project; Technical Specification Group Radio Access Network; Evolved Universal Terrestrial Radio Access (E-UTRA); Physical Channels and Modulation (Release 8), V8.30.0, Valbonne, France, May 2008, pp. 1-79.

* cited by examiner

*Primary Examiner* — Leon Flores
(74) *Attorney, Agent, or Firm* — Robert D. Marshall, Jr.; W. James Brady; Frederick J. Telecky, Jr.

(57) ABSTRACT

A method for transmitting a plurality of sequences across a plurality of bands of a wireless spectrum is described in which a first sequence is produced using a set of reference signal sequences, wherein the set of reference signal sequences comprises at least CAZAC sequences and near-CAZAC sequences. A second sequence is also produced. The first sequence is transmitted in a first band of the wireless spectrum, and the second sequence is transmitted in a second band of the wireless spectrum. The first and the second sequences are transmitted concurrently by a same user equipment.

6 Claims, 6 Drawing Sheets

FIG. 12 ions of the present invention will now be described, by way of example only, and with reference to the accompanying drawings:

REFERENCE SIGNAL STRUCTURE FOR OFDM BASED TRANSMISSIONS

CLAIM OF PRIORITY UNDER 35 U.S.C. 119(e)

The present application claims priority to and incorporates by reference U.S. Provisional Application No. 60/974,184, filed Sep. 21, 2007, entitled "Reference Signal Structure for OFDM Based Transmissions." The present application also claims priority to and incorporates by reference U.S. Provisional Application No. 61/048,392, filed Apr. 28, 2008, entitled "Backwards Compatible SRS Extension for LTE-A." The present application also claims priority to and incorporates by reference U.S. Provisional Application No. 61/051,885, filed May 9, 2008, entitled "Reference Signal Structure for OFDM Based Transmissions."

FIELD OF THE INVENTION

This invention generally relates to wireless cellular communication, and in particular to use of covering sequences in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS 36.211 Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. At times, a reference signal (or a reference signal sequence) can be modulated and be used as a carrier for data. In such cases, the defining property of a reference signal is that its know to both transmitter and receiver prior to the transmission. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Orthogonal frequency division multiple access (OFDMA) based systems include classic OFDMA as well as its alternatives, like single carrier frequency division multiple access (SC-FDMA) and discrete Fourier transform (DFT)-spread OFDMA. In OFDMA based systems, frequency resources are divided into tones. Tones are further grouped into "tone blocks" for purposes of frequency-dependent scheduling of mobiles, and other possible purposes. Thus, each mobile can be allocated one or more "tone blocks" in an OFDMA based system. This group of tone blocks will be denoted as the frequency allocation for a given mobile.

Furthermore, each mobile can send a reference signal (RS) across its frequency allocation. The reference signal serves for coherent data demodulation, channel quality estimation, timing estimation, frequency estimation, and many other possible purposes. When data and the reference signal (RS) from a given mobile are multiplexed in one OFDMA symbol, it is said that they are FDM (frequency division) multiplexed. When they are multiplexed using different OFDM symbols (e.g. one OFDM symbol for data and another for RS), it is said that they are TDM (time division) multiplexed. This disclosure describes a reference signal (RS) structure, where one or more tone blocks can be allocated to any one mobile.

Figure 1:
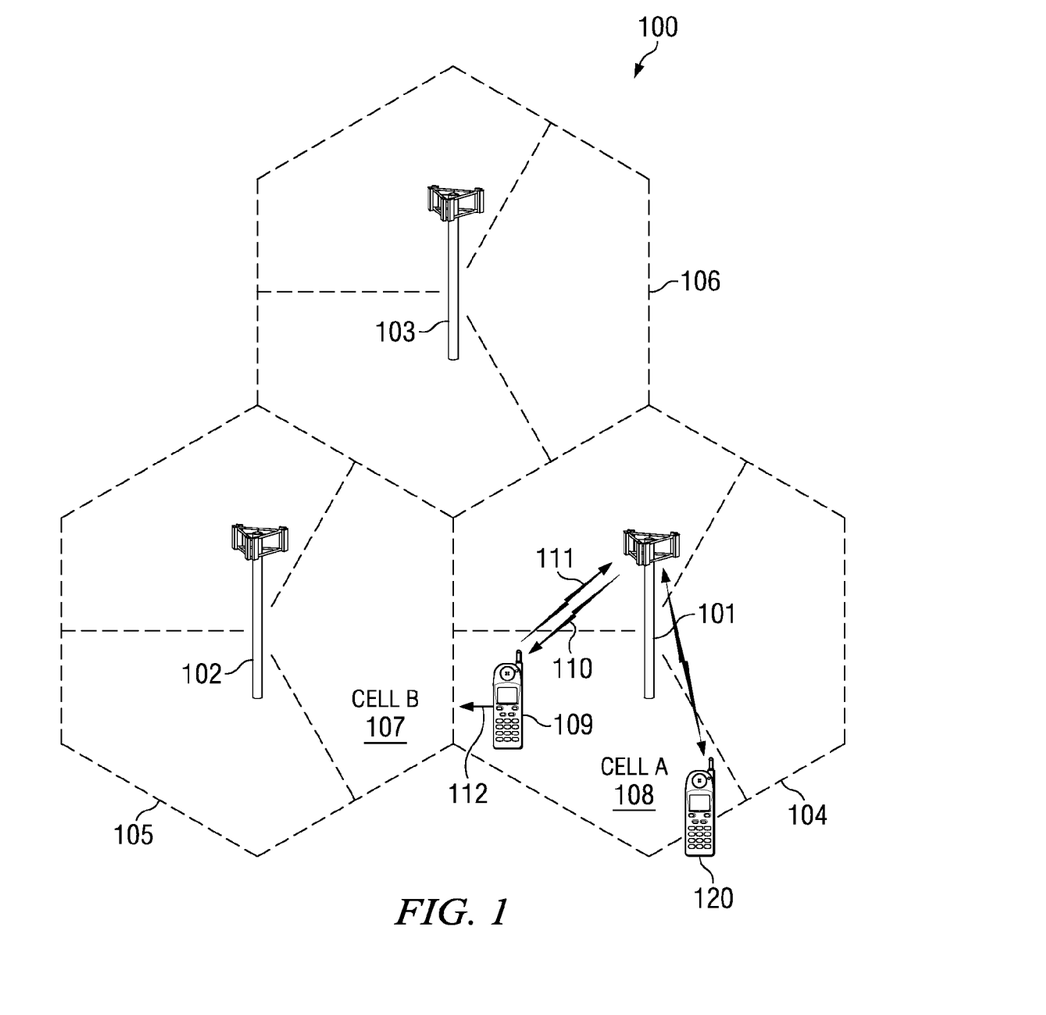
FIG. 1 is a pictorial of an illustrative telecommunications network that supports compatible operation of single and multiple tone block transmissions.

FIG. 1 shows an exemplary wireless telecommunications network 100 that supports compatible operation of single and multiple tone block transmissions. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. Other UEs, including UE 120 may also operates within cell A 108. UE 120 may be allocated multiple tone blocks for transmission while UE 109 is allocated only one tone block for transmission.

A UE in a cell may be stationary such as within a home or office, or may be moving while a user is walking or riding in a vehicle. UE 109 moves within cell 108 with a velocity 112 relative to base station 102.

Figure 2A:
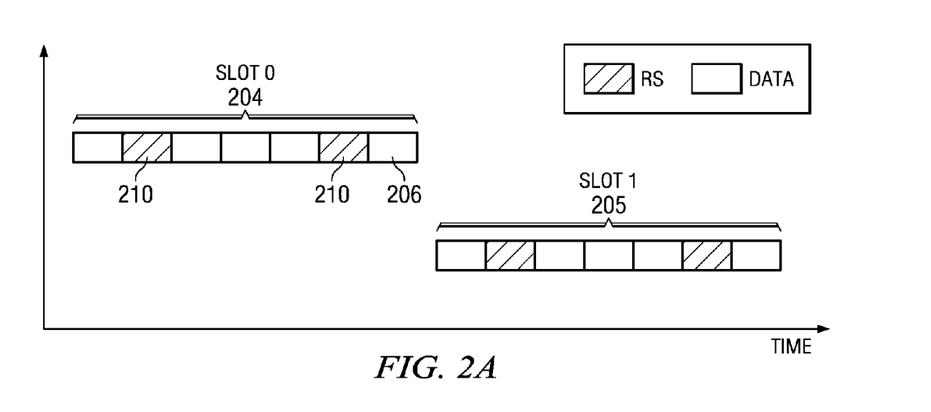
FIGS. 2A and 2B illustrate placement of reference signal symbols in a frame structure used for transmission within the network of FIG. 1.
Figure 2B:
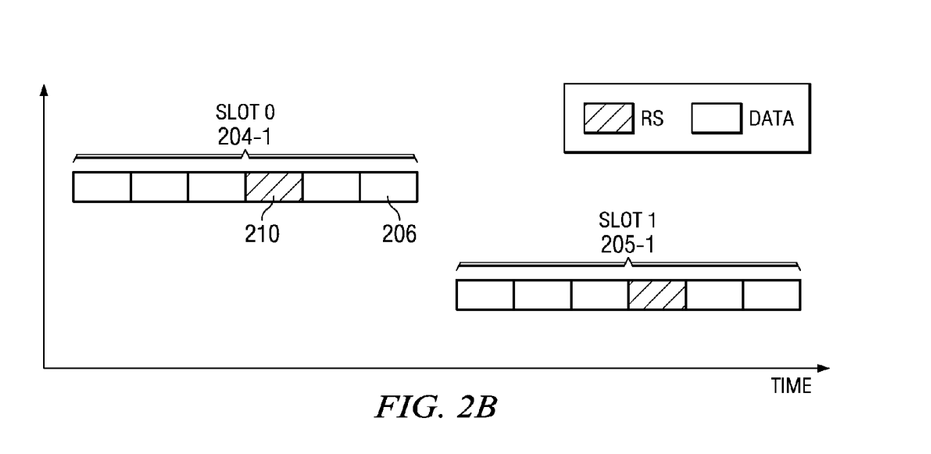

FIGS. 2A and 2B illustrate placement of reference signal symbols 210 in an exemplary frame structure used for transmission within the network of FIG. 1. Each frame contains several subframes. In turn, each subframe contains two slots 204, 205. Each slot contains a number of information carrying symbols, generally indicated at 206. A cyclic protection (CP) field is also appended to each symbol in order to improve reception integrity. In the current E-URTA standard, each slot contains seven symbols 206 if a normal CP length is used or six symbols 206 if an extended CP length is used. Other embodiments of the invention may provide other frame structures than the exemplary frame structure illustrated in FIGS. 2A-2B. FIG. 2A illustrates a subframe with two slots 204, 205 in the normal CP case. Two reference symbols (RS) 210 are included within each slot. FIG. 2B illustrates a subframe with two slots 204-1, 205-1 in the extended CP case. In this case, only one reference symbol 210 is included in each slot.

A reference signal is constructed using a reference signal sequence, typically by modulating a reference signal sequence. The reference signal sequence is known to both transmitter and receiver prior to any transmission. A reference signal sequence is selected from a set of reference signal sequences. In some embodiments of the invention, a collection of "3GPP ($3^{rd}$ Generation Partnership Project) release 8" and "3GPP release 10" mobiles are connected to a "3GPP release 10" network. The "3GPP release 10" network can use several bands for transmission, where release 8 mobile can connect to only one band, and a release 10 mobile can connect to a plurality of bands, wherein each band defines a tone block. This can be referred to as the concept of bandwidth aggregation.

In some embodiments of the invention, a method for transmission of a plurality of sequences across a plurality of frequency bands is described. The method comprises producing a first sequence from the set of reference signal sequences; producing a second sequence; transmitting a first sequence in a first frequency band and transmitting a second sequence in a second frequency band.

The invention can be applied for mobiles which support the bandwidth aggregation concept. In some embodiments of the invention, legacy mobiles are allowed to transmit only in a single frequency band. For example, legacy mobiles can be 3GPP Release 8 mobiles. New mobiles can be 3GPP Release 10 mobiles. New mobiles are allowed to transmit in multiple bands simultaneously. Thus, embodiments of the invention can be applied to new mobiles when transmitting across multiple bands simultaneously. In order to achieve backwards-compatibility with legacy mobiles, the new mobiles (new mobiles=Release 10 mobiles) use the same set of reference signal sequences as the legacy mobiles. Consequently, first sequence is produced using a set of reference signal sequences comprising CAZAC and near-CAZAC sequences. In some embodiments of the invention, second sequence is transmitted in the second band. In some embodiments of the invention, the second band may not be backwards compatible and second sequence can be arbitrary. In some embodiments of the invention, the second band is also backwards compatible and thus, the second sequence is selected using a set of reference signal sequences.

In some embodiments of the invention, the set of reference signal sequences comprises CAZAC sequences and near-CAZAC sequences. Near-CAZAC is a term which designates sequences which are obtained using computer search methods, and whose properties approximate CAZAC properties. In some embodiments of the invention, CAZAC sequences are Zadoff-Chu sequences. In some embodiments of the invention, near-CAZAC sequences are sequences of the form $\exp(j*\pi*\phi(n)/4)$; wherein the length of $\phi(n)$ is an integral multiple of 12. Here, "j" is the imaginary unit.

TABLE 1

Exemplary definition of $\phi(n)$

| U | $\phi(0), \ldots, \phi(11)$ | | | | | | | | | | |
|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −3 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

In some embodiments of the invention, the set of reference signal sequences comprises CAZAC sequences only. In some embodiments of the invention, the set of reference signal sequences comprises near-CAZAC sequences only. In some embodiments of the invention, the set of reference signal sequences comprises both CAZAC sequences and near-CAZAC sequences. For Release 8, the set of reference signal sequences supports both CAZAC and near-CAZAC sequences, and thus a Release 10 should also support both CAZAC and near-CAZAC sequences. Suppose a near-CAZAC sequence is selected to be used for production of a reference signal for Release 10 UE. In order to produce the first sequence, the UE can apply operation $\exp(j*\pi*\phi(n)/4)$. Selection of phase sequence $\phi(n)$ can be made using Table 1 where there are 30 possible sequences of length 12. Sometimes, a phase ramp is applied to modify the first sequence, for example $\exp(j*n*\alpha+j*\pi*\phi(n)/4)$ can still be considered as a reference signal sequence. For 3GPP EUTRA, there are 30 possible sequences of length 24, which are also near-CAZAC. For length 36 and more, sequences are produced from CAZAC sequences. Thus, the set of reference signal sequences comprises both CAZAC and near-CAZAC sequences.

Further details on the construction of reference signals, demodulation reference signals and sounding reference signal are included in 3rd Generation Partnership Project; GPP TS 36.211 V8.3.0 (2008) "Technical Specification Group Radio Access Network; Evolved Universal Terrestrial Radio Access (E-UTRA); Physical Channels and Modulation," in particular in section 5.5 and which is incorporated herein by reference.

Embodiments of the present invention use two sets of sequences to create the reference signal. The distinction between the two sets is logical, meaning that some sequences from one set can be found in another and vice-versa. The first set of sequences will be called the "base set" and it consists of "base sequences." The second set will be called the "covering set," and it consists of sequences which will be denoted as "covering sequences." In some embodiments of the invention, the "base set" is the "set of reference signal sequences." In such embodiments, these two terms can be used interchangeably.

Figure 3:
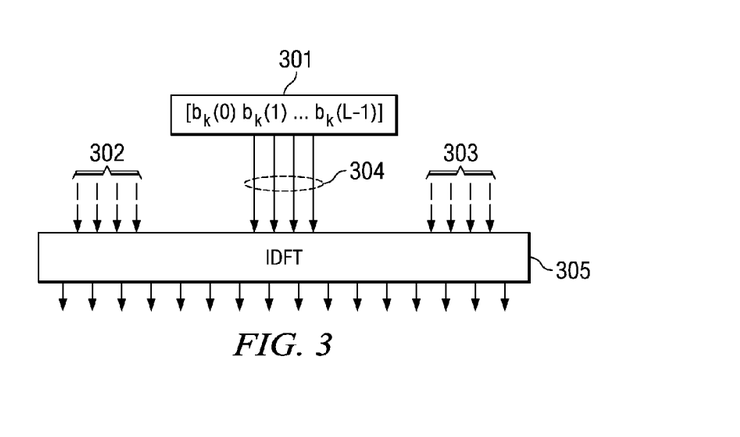
FIG. 3 is a block diagram illustrating a single user equipment (UE) using a single tone block for transmission.

FIG. 3 is a block diagram illustrating a single user equipment (UE) using a single tone block for transmission. When a mobile is allocated only one tone block for an RS symbol, sequences from the base set are used as shown in FIG. 3. Tone block 304 consists of exactly L tones, and thus FIG. 3 also illustrates the concept of a tone block, which was described earlier. The k-th base sequence $[b_k(0)\, b_k(1) \ldots b_k(L-1)]$ of length L, shown by 301, is transmitted across the one tone block 304. In some embodiments, k-th base sequence is also a reference signal sequence, such as defined by Release 8. There are a total of K−1 possible base sequences, which are indexed using indexes from k={0, 1, ..., K−1}. Thus, the k-th base sequence 301 is mapped onto the one tone block. This means that the k-th base sequence occupies some inputs to the inverse discrete Fourier transform (IDFT) block 305, as also shown in FIG. 3. Other inputs to the IDFT block are possible and are represented by 302 and 303. These other inputs 302, 303 can be either empty (void, non-existent), can be zeros, can be other signals, or a combination thereof. Outputs of the IDFT block can then be further modulated, as is classic in OFDM based systems or other systems. The IDFT block can be implemented using the inverse fast Fourier transform (IFFT). FIG. 3 thus illustrates a reference signal transmission of one tone block allocation.

Figure 4:
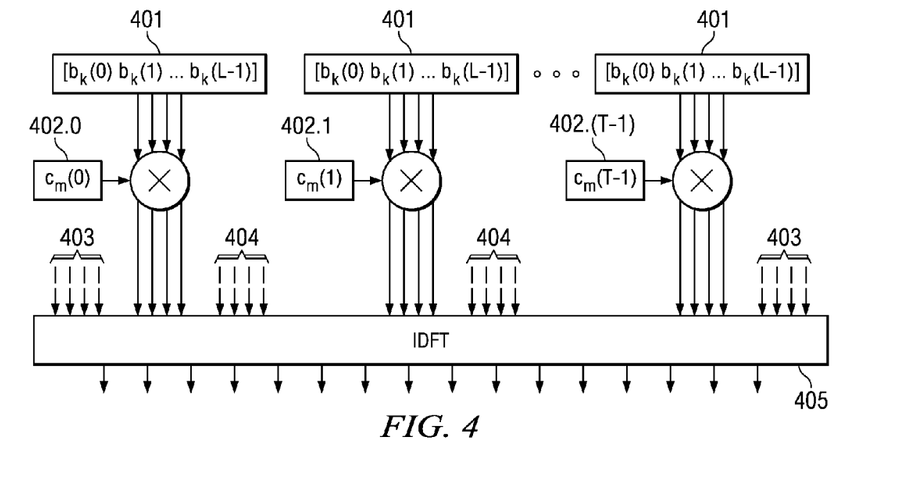
FIG. 4 is a block diagram illustrating operation of a different UE that is allocated additional tone blocks that operates compatibly with the UE of FIG. 3.

FIG. 4 is a block diagram illustrating operation of a second UE that is allocated additional tone blocks that operates compatibly with the UE of FIG. 3. The transmitter diagram in FIG. 4 uses k-th base sequence $[b_k(0)\, b_k(1) \ldots b_k(L-1)]$, represented by 401, as well as the m-th covering sequence $[c_m(0)\, c_m(1) \ldots c_m(T-1)]$, of length T. Entries of the covering sequence are shown by 402.0, 402.1, ..., 402.(T−1). The length T of the covering sequence equals the number of tone blocks across which the RS is being transmitted. Thus, the covering sequence can have variable length during the call. For example, if a mobile is allocated three tone blocks (for RS), the covering sequence is of length three, and if the mobile is later allocated four tone blocks, the covering sequence is of length four, etc. In the transmitter diagram from FIG. 4, the base sequence 401 is multiplied by individual entries of the covering sequence, as shown by 402.0, 402.1, ..., 402.(T−1). For example, to generate the signal for the zero-th allocated tone block, the base sequence $[b_k(0)\, b_k(1) \ldots b_k(L-1)]$ represented by 401 is multiplied by $c_m(0)$ represented by 402.0. The result of this multiplication is

[$c_m(0)b_k(0) \ c_m(0)b_k(1) \ldots c_m(0)b_k(L-1)$], and this is the IDFT input for the zero-th allocated tone block. Note that indexing starts from zero (t=0). Thus tone blocks are indexed from t={0, 1, ..., T−1}. In general, to generate the IDFT input signal for some allocated tone block t, the base sequence [$b_k(0) \ b_k(1) \ldots b_k(L-1)$] represented by 401 is multiplied by $c_m(t)$ represented by 402.$t$. The result of this multiplication is [$c_m(t)b_k(0) \ c_m(t)b_k(1) \ldots c_m(t)b_k(L-1)$], and this is the IDFT input for the allocated tone block t. As t ranges in the set t={0, 1, ..., T−1}, all IDFT inputs to allocated tone blocks are defined, as shown in FIG. 4. Note that the IDFT (labeled 405) has now defined inputs for the entire T allocated tone blocks, where naturally, the allocation is for the RS. Nevertheless, "additional inputs" to the IDFT are possible, and are represented by 403 and 404. In some embodiments, 403, i.e. signals in between allocated tone blocks, are void (non-existent, empty). This occurs when the allocation of the T tone blocks is contiguous, and thus there are no signals in between. In some embodiments, signals at the edges 404 comprise from zeros to fill the IDFT size. In general, the "additional inputs" 403, 404 can comprise zeros, other signals, can be non-existent altogether, or any combination thereof.

Note that the length T of the cover sequence depends on the allocation: it equals the number of allocated tone blocks. In some embodiments of the invention, this is the number of bands. Furthermore, the number of possible covering sequences will be denoted by $M_T$ for the allocation of T tone blocks. Thus, for every possible allocation of T tone blocks, there is a choice from $M_T$ possible covering sequences. This set of all possible covering sequences comprise the second above mentioned set, i.e. "covering set." Thus, in order to apply covering as in FIG. 4, sequences from the covering set are selected, where the selected sequence has length T equaling the number of allocated tone blocks. Terms "cover" and "covering" can be used interchangeably.

Figure 5:
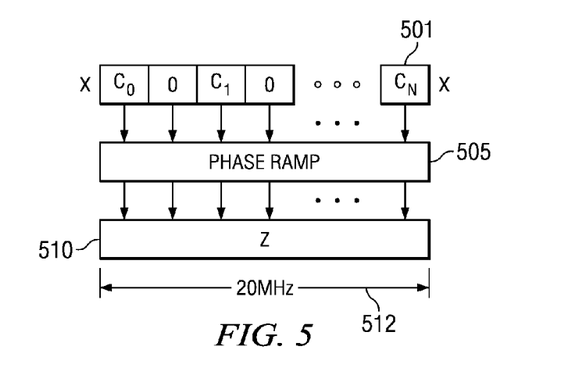
FIG. 5 is a simplified block diagram illustrating operation of a UE to produce a sounding reference symbol (SRS) sequence Z.

FIG. 5 is a simplified block diagram illustrating operation of a UE to produce a sounding reference signal (SRS) transmission signal Z for a 20 Mhz embodiment. An SRS is a wideband signal that spans the entire 20 Mhz band 512 and is used to facilitate frequency dependent scheduling, as opposed to the narrow band RS that only spans the frequency resource allocated to one OFDM symbol and is used for symbol demodulation. Sequence G [$C^0 \ldots C_N$] 501 is a Zadoff-Chu sequence similar to that described above that is phase ramped in the frequency domain by module 505 to form a generated SRS sequence Z 510 that is then transmitted as an SRS signal from the UE. Phase ramping in the frequency domain is equivalent to cyclic shifting in the time domain.

Figure 6:
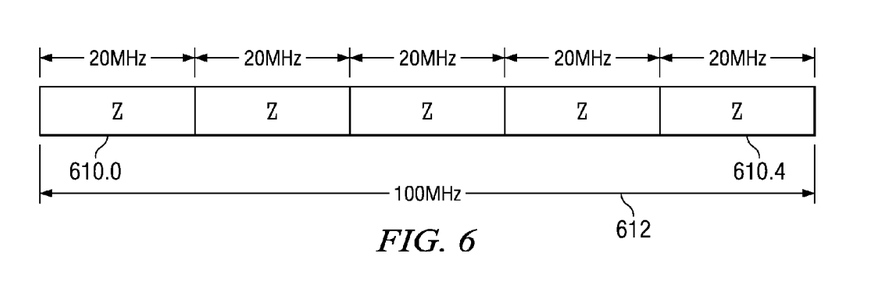
FIG. 6 is a block diagram illustrating operation of a different UE to produce a compatible SRS transmission across multiple bands.

FIG. 6 is a block diagram illustrating operation of a second UE to produce an SRS transmission across multiple bands (Release 10 mobile which supports bandwidth aggregation) that is compatible with the UE of FIG. 5. In this embodiment, the second UE is allocated five bands for a total allocation of 100 MHz, illustrated at 612. In this embodiment, the second UE repeats a same generated SRS sequence Z as indicated at 610.0-610.4. In this manner, both the first UE as illustrated in FIG. 5 and the second UE as illustrated in FIG. 6 can both operate compatibly within the network of FIG. 1 using overlapping bands and a base station, such as base station 101, can receive an SRS from the first UE on a first band and later receive an SRS from the second UE on multiple bands that include the same first band. Note that SRS is just an example of reference signal (RS) transmission. All embodiments with SRS also apply with SRS replaced by a generic RS transmission.

Figure 7:
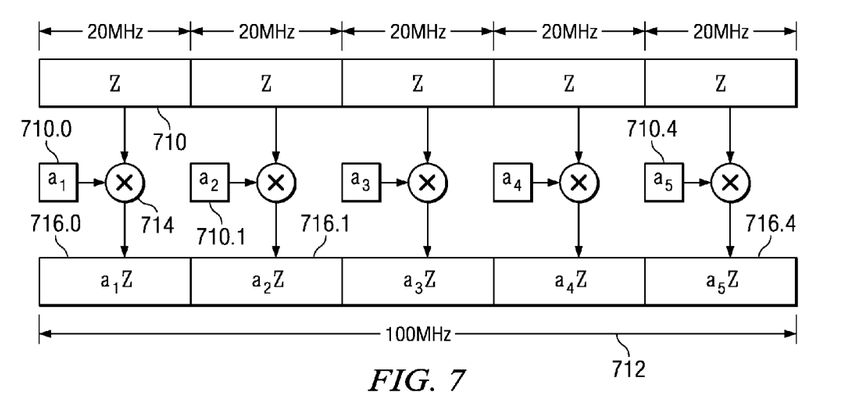
FIG. 7 illustrates an embodiment in which a multiband SRS sequence is modified by a covering sequence prior to transmission.

FIG. 7 illustrates another embodiment in which the generated SRS multiband sequence is further modified prior to transmission. Similar to the RS scheme described with respect to FIG. 4, for SRS transmission on multiple bands the generated sequence Z 710 is used to spread a second sequence [$a_1 a_2 a_3 a_4 a_5$] indicated at 710.0, 710.0-710.4. In this embodiment, each 20 MHz chunk of bandwidth transmits a scaled version of the generated SRS sequence Z 716. A piece-wise multiplier, generally indicated at 714, multiplies each element of second sequence [710.0 710.1 710.2 710.3 710.4] by generated SRS sequence Z 710.

Similarly to FIG. 4, the second sequence in FIG. 7 is referred to as a cover sequence. For M multiple 20 MHz bands, the length M of the cover sequence depends on the allocation: it equals the number of allocated frequency bands. Furthermore, the number of possible covering sequences will be denoted by NM for the allocation of M multiple frequency bands. Thus, for every possible allocation of M multiple frequency bands, there is a choice from NM possible covering sequences. This set of all possible covering sequences comprise the second above mentioned set, i.e. "covering set." Thus, in order to apply covering as in FIG. 7, sequences from the covering set are selected, where the selected sequence has length M equaling the number of allocated frequency bands. Terms "cover" and "covering" can be used interchangeably.

CAZAC sequences are complex-valued sequences with the following properties: 1) constant amplitude (CA), and 2) zero cyclic autocorrelation (ZAC). Examples of CAZAC sequences include (but are not limited to): Chu Sequences, Frank-Zadoff Sequences, Zadoff-Chu (ZC) Sequences, and Generalized Chirp-Like (GCL) Sequences. Zadoff-Chu (ZC) sequences are defined by:

$$a(k)=\exp[j2\pi(u/N)[k(k+1)/2+qk]] \text{ for } N \text{ odd}$$

$$a(k)=\exp[j2\pi(u/N)[k2/2+qk]] \text{ for } N \text{ even}$$

An alternative convention of the ZC definition replaces "j" (complex unit) in the above formulas by "−j." Either convention can be adopted. For the representative CAZAC example, the formula was cited on page 53 from K. Fazel and S. Keiser, "Multi Carrier and Spread Spectrum Systems," John Wiley and Sons, 2003. In the above formula, "u" and "N" are relatively prime, and "q" is any fixed integer. For example, q=0 is a good choice, because it simplifies computation as qk=0. Also, "k" is the index of the sequence element (k is from {0, 1, ..., N−1}), and "u" is the index of the root ZC sequence. Making "N" a prime number maximizes the set of root ZC sequences having optimal cross-correlation. Thus, when "N" is prime, there are "(N−1)" possible choices for "u," where each choice results in a distinct root ZC CAZAC sequence. The terms: Zadoff-Chu, ZC, and ZC CAZAC, are commonly used interchangeably. The term CAZAC denotes any CAZAC sequence, like ZC, or otherwise.

Some embodiments of CAZAC sequences are ZC sequences. Some embodiments of the invention use CAZAC sequences (for example, ZC sequences specifically) to construct the base sequences. Some embodiments of the invention use CAZAC sequences (for example, ZC sequences specifically) to construct to construct the cover sequences. In some embodiments, cover sequences are exactly CAZAC sequences. In some embodiments, base sequences are exactly CAZAC sequences. In other embodiments, CAZAC sequences can be modified to generate cover sequences. In other embodiments, CAZAC sequences can be modified to generate base sequences. In some embodiments, base sequences are found using a computer search, and cover sequences are CAZAC sequences, modified or otherwise (exact). In some embodiments, cover sequences are found using a computer search, and base sequences are CAZAC sequences, modified or otherwise (exact). In other embodiments, both base and cover sequences are found using the computer based search methods. In other embodiments, either base or cover sequences can be generated using linear-feedback-shift registers (LSFR), or using a closed form expression.

In some embodiments, CAZAC sequences are modified to produce base sequences. Some embodiments of this modification can be simple pass-through, which is "no modification." In other embodiments, a (preferably prime-length) CAZAC sequence is cyclically extended by v samples. If a sequence is [a(0) a(1) ... a(N−1)] then the operation of cyclic extension produces [a(0) a(1) ... a(N−1) a(0) a(1) ... a(v−1)], where v is the length of the cyclic extension. Note that cyclic prefixing is also possible instead of cyclic extension. Some embodiments of the CAZAC modification can involve a truncation of a CAZAC sequence. Truncation simply omits some of the sequence elements. Some embodiments of the CAZAC modification involve up-sampling of the CAZAC sequence. By up-sampling, we mean insertion of w−1 zeros between each of the sequence elements, where the up-sampling factor is w. For example, if a sequence is [a(0) a(1) ... a(N−1)] then the operation of up-sampling by w=2 gives [a(0) 0 a(1) 0 a(2) 0 ... a(N−1) 0]. Other up-sampling factors are possible. In other embodiments, CAZAC modification can comprise by transforming by a DFT or an IDFT, or by any unitary transformation. In general, CAZAC modification can comprise any said modification or a combination thereof. Thus, the modified CAZAC sequence produces a base sequence.

In some embodiments, CAZAC sequences are modified to produce cover sequences. Some embodiments of this modification can be simple pass-through, which is "no modification." In other embodiments, a (preferably prime-length) CAZAC sequence is cyclically extended by v samples. If a sequence is [a(0) a(1) ... a(N−1)] then the operation of cyclic extension produces [a(0) a(1) ... a(N−1) a(0) a(1) ... a(v−1)], where v is the length of the cyclic extension. Note that cyclic prefixing is also possible instead of cyclic extension. Some embodiments of the CAZAC modification can involve a truncation of a CAZAC sequence. Truncation simply omits some of the sequence elements. Some embodiments of the CAZAC modification involve up-sampling of the CAZAC sequence. By up-sampling, we mean insertion of w−1 zeros between each of the sequence elements, where the up-sampling factor is w. For example, if a sequence is [a(0) a(1) ... a(N−1)] then the operation of up-sampling by w=2 gives [a(0) 0 a(1) 0 a(2) 0 ... a(N−1) 0]. Other up-sampling factors are possible. In other embodiments, CAZAC modification can comprise by transforming by a DFT or an IDFT, or by any unitary transformation. In general, CAZAC modification can comprise any said modification or a combination thereof. Thus, the modified CAZAC sequence produces a cover sequence.

In other embodiments, (preferably computer-based) search methods can be used to produce either base sequences or cover sequences. In some embodiments these computer-based search methods can produce sequences which have a low Peak-to-Average-Power Ratio (PAPR) in the time-domain (after the IDFT). In some embodiments, these search methods can produce sequences which are constant amplitude. When search methods are used, sequences are typically stored in memory and read when necessary. One benefit of the proposed sequence construction method is that, if both base and cover sequences have low PAPR (in time-domain, after IDFT), then the resultant time domain transmission will also be a low-PAPR transmission. This can increase cell coverage, for example. Thus, such proposed RS generation can be applied in general, but becomes especially useful when the data is SC-OFDMA modulated (for example, via DFT-spread OFDM), and is TDM multiplexed with the reference signal. However, the proposed RS construction method can be applied and can bring benefits more generally.

In some embodiments, special provisions can be made for two tone blocks, and a special sequence set can be designed for those allocations. In other embodiments, the allocation of two tone blocks is treated as any other allocation, and the transmitter diagram is described as above. In some embodiments, time-domain cyclic shifts of the resultant transmission can be used to multiplex different users. Thus, different users can have the same base sequence and the cover sequence, but they are allocated different time-domain cyclic shifts, which can be implemented after the IDFT, in the transmitter diagram. Both "sequence hopping" and "cyclic shift hopping" are possible with the described RS sequence construction. With sequence hopping, or cyclic shift hopping, selection of the sequence (both cover and base), and of the cyclic shift, is implicit through the information shared by the transmitter and the receiver. Sequence planning is also possible with the described RS sequence construction. With sequence planning, network topology is used to allocate different sequences to adjacent cells. Combinations of hopping and planning are possible. In some embodiments, base sequences are used for cell planning and cover sequences are used for hopping. In some embodiments, if z[k] are inputs to the IDFT, then baseband time-domain signal is the sum of z[k] exp [j2 π(τ−τ0) kΔf] over all inputs k. Here, τ is continuous time, τ0 is cyclic prefix duration, Δf is tone spacing, and j is imaginary unit. Thus, in some embodiments, IDFT can be skipped and the equivalent operation performed by adding z[k] exp [j2π(τ−τ0)kΔf] over all k.

Figure 8:
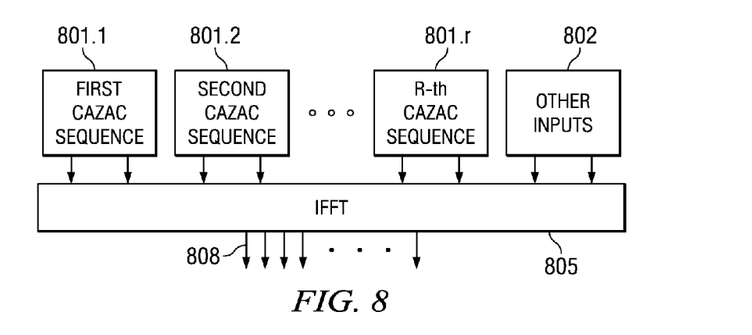
FIG. 8 is an illustration of a UE that uses multiple CAZAC sequences for transmission on multiple tone blocks.

FIG. 8 is an illustration of a UE that uses multiple CAZAC sequences for transmission on multiple tone blocks. In this example, first CAZAC sequence 801.1 is applied to a first set of inputs on IFFT block 805. A second different CAZAC sequence 801.2 is applied to a second set of inputs on IFFT 805. Additional different CAZAC sequences up through an R-th sequence as indicated at 801.r are applied to additional inputs on IFFT 805. In addition, other inputs 802, as discussed previously, may also be applied to additional inputs of IFFT 805. These other inputs 802 can be either empty (void, non-existent), can be zeros, can be other signals, or a combination thereof. After being transformed via IFFT module 805 a generated sequence on outputs 808 may be serialized and transmitted.

Figure 9:
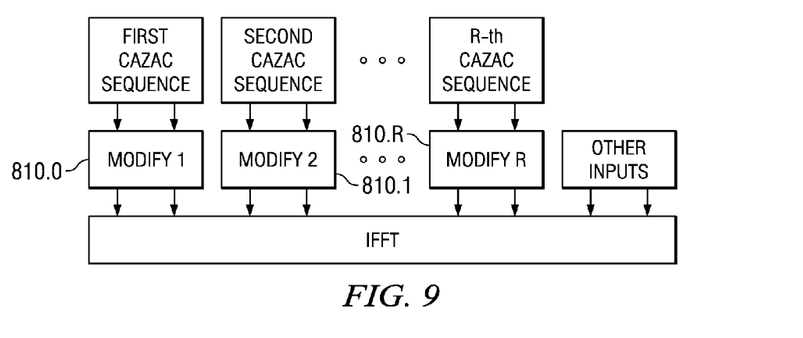
FIG. 9 illustrates another embodiment of FIG. 8 in which the multiple CAZAC sequences are each modified.

FIG. 9 illustrates another embodiment of FIG. 8 in which the multiple CAZAC sequences are each modified by modification circuitry 810.0, 810.1-810.R. Some embodiments of this modification can be simple pass-through, which is "no modification." In other embodiments, a (preferably prime-length) CAZAC sequence is cyclically extended by v samples. If a sequence is [a(0) a(1) ... a(N−1)] then the operation of cyclic extension produces [a(0) a(1) ... a(N−1) a(0) a(1) ... a(v−1)], where v is the length of the cyclic extension. Note that cyclic prefixing is also possible instead of cyclic extension. Some embodiments of the CAZAC modification can involve a truncation of a CAZAC sequence. Truncation simply omits some of the sequence elements. Some embodiments of the CAZAC modification involve up-sampling of the CAZAC sequence. By up-sampling, we mean insertion of w−1 zeros between each of the sequence elements, where the up-sampling factor is w. For example, if a sequence is [a(0) a(1) ... a(N−1)] then the operation of up-sampling by w=2 gives [a(0) 0 a(1) 0 a(2) 0 ... a(N−1) 0]. Other up-sampling factors are possible. In other embodiments, CAZAC modification can comprise by transforming by a DFT or an IDFT, or by any unitary transformation. In general, CAZAC modification can comprise any said modification or a combination thereof. Thus, the modified CAZAC sequence produces a base sequence.

Figure 10:
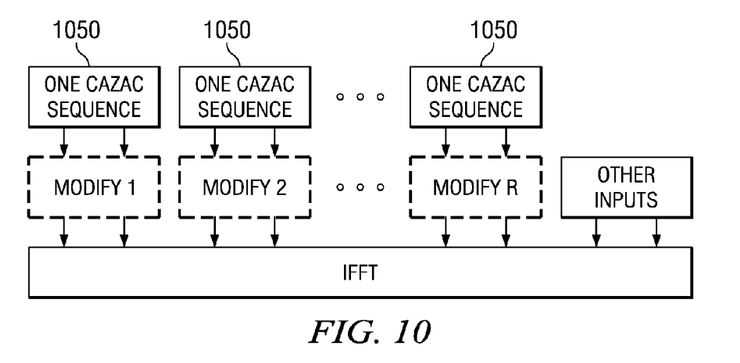
FIG. 10 is an illustration of another embodiment of a UE that uses a same CAZAC sequence for transmission on multiple tone blocks.

FIG. 10 is an illustration of another embodiment of a UE that uses a same CAZAC sequence 1050 for transmission on multiple tone blocks or on multiple frequency bands, as described in more detail above.

Figure 11:
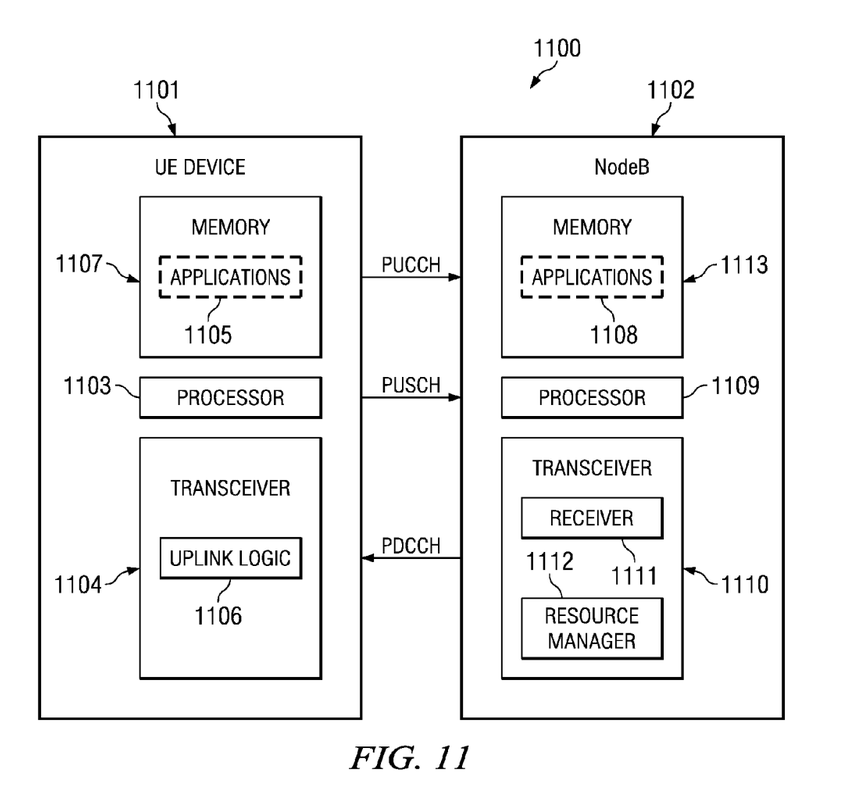
FIG. 11 is a block diagram of a Node B and a User Equipment for use in the network system of FIG. 1.

FIG. 11 is a block diagram illustrating operation of an eNB and a mobile UE in the network system of FIG. 1. As shown in FIG. 11, wireless networking system 1100 comprises a mobile UE device 1101 in communication with an eNB 1102. The mobile UE device 1101 may represent any of a variety of devices such as a server, a desktop computer, a laptop computer, a cellular phone, a Personal Digital Assistant (PDA), a smart phone or other electronic devices. In some embodiments, the electronic mobile UE device 1101 communicates with the eNB 1102 based on a LTE or E-UTRAN protocol. Alternatively, another communication protocol now known or later developed can be used.

As shown, the mobile UE device 1101 comprises a processor 1103 coupled to a memory 1107 and a Transceiver 1104. The memory 1107 stores (software) applications 1105 for execution by the processor 1103. The applications 1105 could comprise any known or future application useful for individuals or organizations. As an example, such applications 1105 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 1105, at least some of the applications 1105 may direct the mobile UE device 1101 to transmit UL signals to the eNB (base-station) 1102 periodically or continuously via the transceiver 1104. In at least some embodiments, the mobile UE device 1101 identifies a Quality of Service (QoS) requirement when requesting an uplink resource from the eNB 1102. In some cases, the QoS requirement may be implicitly derived by the eNB 1102 from the type of traffic supported by the mobile UE device 1101. As an example, VOIP and gaming applications often involve low-latency uplink (UL) transmissions while High Throughput (HTP)/Hypertext Transmission Protocol (HTTP) traffic can involve high-latency uplink transmissions.

As shown in FIG. 11, the transceiver 1104 comprises uplink logic 1106. The uplink logic executes instructions that control the operation of the transceiver. Some of these instructions may be stored in memory 1107 and executed when needed. As would be understood by one of skill in the art, the components of the Uplink Logic 1106 may involve the physical (PHY) layer and/or the Media Access Control (MAC) layer of the transceiver 1104. Transceiver 1104 includes one or more receivers and one or more transmitters. The transmitter(s) may be embodied as described with respect to FIGS. 5-11 to support multiple tone block demodulation RS sequences and/or multiple band SRS transmissions.

As shown in FIG. 11, the eNB 1102 comprises a Processor 1109 coupled to a memory 1113 and a transceiver 1110. The memory 1113 stores applications 1108 for execution by the processor 1109. The applications 1108 could comprise any known or future application useful for managing wireless communications. At least some of the applications 1108 may direct the base-station to manage transmissions to or from the user device 1101.

Transceiver 1110 comprises an uplink Resource Manager 1112, which enables the eNB 1102 to selectively allocate uplink PUSCH resources to the user device 1101. As would be understood by one of skill in the art, the components of the uplink resource manager 1112 may involve the physical (PHY) layer and/or the Media Access Control (MAC) layer of the transceiver 1110. Transceiver 1110 includes a Receiver 1111 for receiving transmissions from various UE within range of the eNB.

Uplink resource manager 1112 executes instructions that control the operation of transceiver 1110. Some of these instructions may be located in memory 1113 and executed when needed. Resource manager 1112 controls the transmission resources allocated to each UE that is being served by eNB 1102 and broadcasts control information via the physical downlink control channel PDCCH. In particular, for the transmission of multiple tone block RS sequences and multiple band SRS transmissions from UE within cell(s) served by the eNB, eNB 1102 schedules the spreading codes and cyclic shifted root sequences in the time-frequency resource, as in the previously described examples.

Transceiver 1110 and receiver 1111 is also operable to receive and demodulate RS sequences transmitted from various UE on both a single tone block and on multiple tone blocks. Likewise, transceiver 1110 and receiver 1111 is also operable to receive and demodulate SRS transmission on both a single frequency band and on multiple frequency bands, as described above. The decoding process for multiple tone block RS and multiple frequency band SRS is essentially the inverse of the processes described with respect to FIGS. 3-10.

Figure 12:
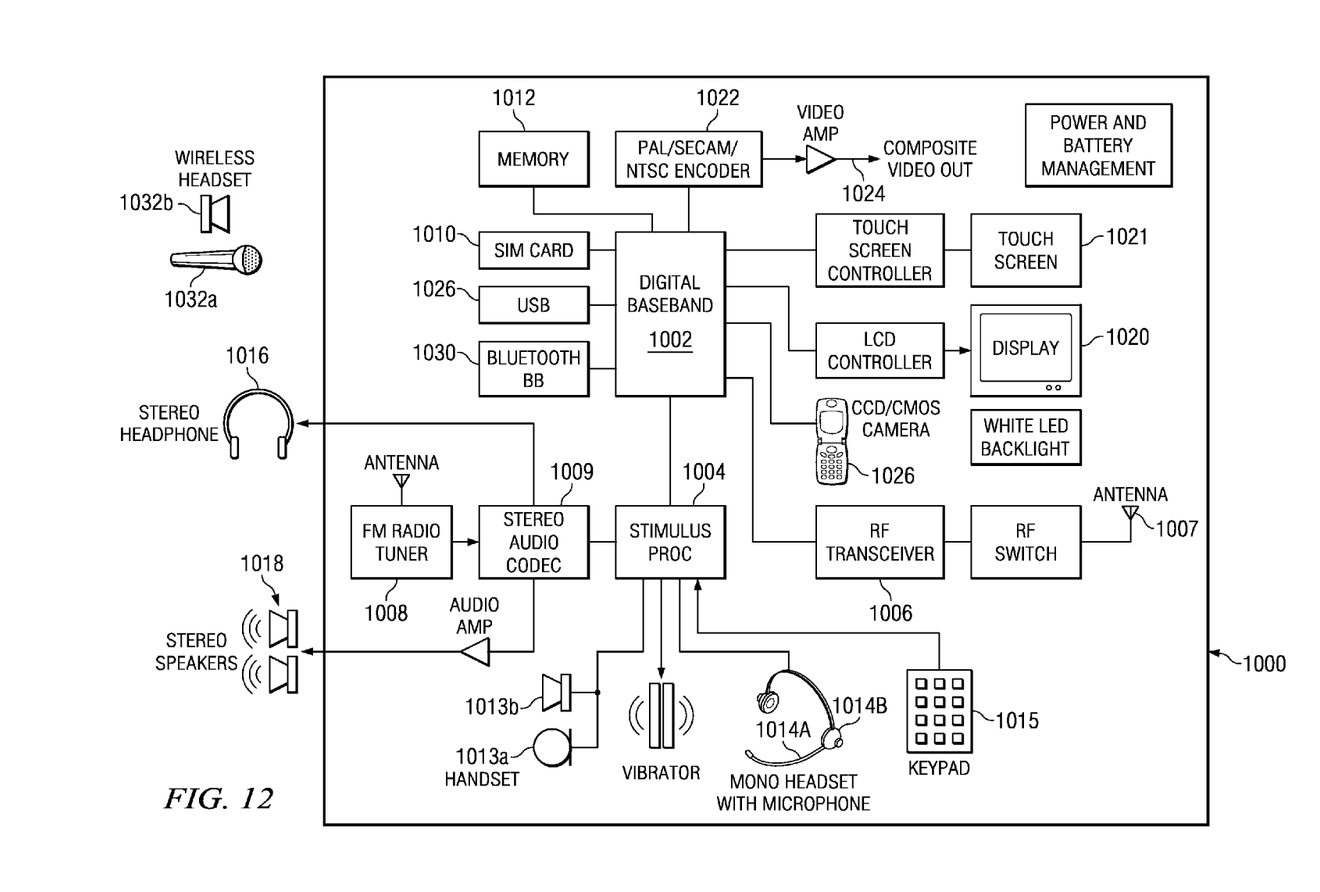
FIG. 12 is a block diagram of a cellular phone for use in the network of FIG. 1.

FIG. 12 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For higher data rate transmission, a transmitter(s) within transceiver 1006 may be embodied to allow transmission on multiple channels with a multiple tone block RS. The transmitter may be further arranged to transmit on multiple frequency blocks using a multiple frequency block SRS as described with respect to FIGS. 3-11. In some embodiments, other types of transmissions by the UE may also use the covering sequence scheme as described herein. In other embodiments, other types of transmissions by the UE may also use the multiple sequence transmission scheme as described herein.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot. Similarly, frequency bands may be larger or smaller than 20 MHz; for example: 1.25 MHz, 2.5 MHz, 5.0 MHZ, 10 MHZ, 15 MHz, 25 MHz, etc.

In various embodiments, the covering sequence is produced using at least one element of uplink control information (UCI). UCI may include one or more of the following parameters or status information: ACKNAK information, scheduling request indicator (SRI) information, Rank information, etc. In another embodiment, the covering sequence may be a power control sequence. In some embodiments of the invention, instructions are sent to the UE via a closed loop. These can be calibration instructions.

It is therefore contemplated that the appended claims will cover any such modifications of the embodiments as fall within the true scope and spirit of the invention.

What is claimed is:

1. A method for transmitting a plurality of sequences across a plurality of bands of a wireless spectrum, comprising:
producing a first sequence using a set of reference signal sequences, wherein the set of reference signal sequences comprises at least CAZAC sequences and near-CAZAC sequences;
producing a second sequence; and
transmitting the first sequence in a first band of the wireless spectrum;
transmitting the second sequence in a second band of the wireless spectrum, wherein the first and the second sequences are transmitted concurrently by a same user equipment; and
wherein said CAZAC sequences are Zadoff-Chu (ZC) sequences; and wherein said near-CAZAC sequences have a form $\exp(j*\pi*\phi(n)/4)$, wherein the length of $\phi(n)$ is an integral multiple of 12.

2. A method for transmitting a plurality of sequences across a plurality of bands of a wireless spectrum, comprising:
producing a first sequence using a set of reference signal sequences, wherein the set of reference signal sequences comprises at least CAZAC sequences and near-CAZAC sequences;
selecting a reference signal sequence from the set of reference signal sequences;
producing a second sequence using said set of reference signal sequences by multiplying the second covering element with each entry of the selected reference signal sequence;
storing auxiliary elements in a memory;
producing a covering sequence comprising at least a second covering element from the stored auxiliary elements;
transmitting the first sequence in a first band of the wireless spectrum; and
transmitting the second sequence in a second band of the wireless spectrum, wherein the first and the second sequences are transmitted concurrently by a same user equipment.

3. A method for transmitting a plurality of sequences across a plurality of bands of a wireless spectrum, comprising:
producing a first sequence using a set of reference signal sequences, wherein the set of reference signal sequences comprises at least CAZAC sequences and near-CAZAC sequences;
selecting a reference signal sequence from the set of reference signal sequences;
producing a second sequence using said set of reference signal sequences by multiplying the second covering element with each entry of the selected reference signal sequence;
receiving at least one instruction from a NodeB;
producing a covering sequence comprising at least a second covering element using the received instruction;
transmitting the first sequence in a first band of the wireless spectrum; and
transmitting the second sequence in a second band of the wireless spectrum, wherein the first and the second sequences are transmitted concurrently by a same user equipment.

4. A method for transmitting a plurality of sequences across a plurality of bands of a wireless spectrum, comprising:
producing a first sequence using a set of reference signal sequences, wherein the set of reference signal sequences comprises at least CAZAC sequences and near-CAZAC sequences;
producing a covering sequence comprising at least a second covering element; and
selecting a reference signal sequence from the set of reference signal sequences;
adding a phase ramping sequence to the phase sequence of the selected reference signal sequence;

producing a second sequence using said set of reference signal sequences including multiplying the second covering element with each entry of the selected reference signal sequence;

transmitting the first sequence in a first band of the wireless spectrum; and transmitting the second sequence in a second band of the wireless spectrum, wherein the first and the second sequences are transmitted concurrently by a same user equipment.

5. A method for transmitting a plurality of sequences across a plurality of bands of a wireless spectrum, comprising:

producing a first sequence using a set of reference signal sequences, wherein the set of reference signal sequences comprises at least CAZAC sequences and near-CAZAC sequences;

producing a covering sequence comprising at least a second covering element, wherein the length of the covering sequence is less than or equal to 5;

selecting a reference signal sequence from the set of reference signal sequences;

producing a second sequence using said set of reference signal sequences including multiplying the second covering element with each entry of the selected reference signal sequence;

transmitting the first sequence in a first band of the wireless spectrum; and transmitting the second sequence in a second band of the wireless spectrum, wherein the first and the second sequences are transmitted concurrently by a same user equipment.

6. An apparatus for transmitting a plurality of sequences across a plurality of bands of a wireless spectrum, comprising:

logic for producing a first sequence using a set of reference signal sequences, wherein the set of reference signal sequences comprises at least CAZAC sequences and near-CAZAC sequences comprising a functional module for producing CAZAC sequences and a functional module for producing near-CAZAC sequences having a form $\exp(j*\pi*\phi(n)/4)$, wherein the length of $\phi(n)$ is an integral multiple of 12;

logic for producing a second sequence; and transmitter circuitry operable to transmit the first sequence in a first band of the wireless spectrum and to transmit the second sequence in a second band of the wireless spectrum.

\* \* \* \* \*